US010815949B2

(12) United States Patent
Yasukawa et al.

(10) Patent No.: US 10,815,949 B2
(45) Date of Patent: Oct. 27, 2020

(54) FUEL INJECTION DEVICE

(71) Applicant: Hitachi Automotive Systems, Ltd., Hitachinaka-shi, Ibaraki (JP)

(72) Inventors: Yoshihito Yasukawa, Tokyo (JP); Kiyotaka Ogura, Hitachinaka (JP); Takao Miyake, Hitachinaka (JP); Akira Iizuka, Hitachinaka (JP); Kazuki Yoshimura, Tokyo (JP); Akiyasu Miyamoto, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 7 days.

(21) Appl. No.: 16/301,552

(22) PCT Filed: Apr. 13, 2017

(86) PCT No.: PCT/JP2017/015083
§ 371 (c)(1),
(2) Date: Nov. 14, 2018

(87) PCT Pub. No.: WO2017/212781
PCT Pub. Date: Dec. 14, 2017

(65) Prior Publication Data
US 2019/0211791 A1    Jul. 11, 2019

(30) Foreign Application Priority Data

Jun. 10, 2016  (JP) ................................ 2016-115824

(51) Int. Cl.
*F02M 61/18*    (2006.01)
*F02M 61/10*    (2006.01)
(Continued)

(52) U.S. Cl.
CPC .......... *F02M 61/18* (2013.01); *F02M 51/061* (2013.01); *F02M 61/10* (2013.01); *F02M 61/1813* (2013.01); *F16K 1/443* (2013.01)

(58) Field of Classification Search
CPC ...... F02M 61/18; F02M 61/10; F02M 51/061; F02M 61/1813; F16K 1/443
(Continued)

(56) References Cited

U.S. PATENT DOCUMENTS 5,762,272 A    6/1998  Tani et al.
6,616,071 B2 *  9/2003  Kitamura ......... F02M 35/10216
                                             239/533.12
(Continued)

FOREIGN PATENT DOCUMENTS

JP         9-14090 A       1/1997
JP      2011-127486 A      6/2011
JP      2011-153548 A      8/2011

OTHER PUBLICATIONS

International Search Report with English translation and Written Opinion issued in corresponding application No. PCT/JP2017/015083 dated Jun. 20, 2017.

*Primary Examiner* — Steven J Ganey
(74) *Attorney, Agent, or Firm* — Foley & Lardner LLP

(57) ABSTRACT

Provided is a structure capable of reducing dribbling of fuel generated when a valve body is closed. In order to achieve the above object, a fuel injection device includes: a valve body; and a seat member having a seat portion on which the valve body is seated and having a fuel injection hole formed on a downstream side of the seat portion. The seat member is formed such that a gap between the seat member and the opposing valve body in the whole region on the downstream side of the fuel injection hole is smaller than a diameter of the fuel injection hole.

11 Claims, 9 Drawing Sheets

(51) Int. Cl.
*F02M 51/06* (2006.01)
*F16K 1/44* (2006.01)

(58) Field of Classification Search
USPC ........ 239/585.1, 585.2, 585.4, 585.5, 533.12
See application file for complete search history.

(56) References Cited

U.S. PATENT DOCUMENTS

| | | | |
|---|---|---|---|
| 6,764,031 B2 * | 7/2004 | Sebastian | F02M 51/0671 239/494 |
| 7,980,485 B2 * | 7/2011 | Peterson, Jr. | F02M 61/1853 239/11 |

* cited by examiner

FUEL INJECTION DEVICE

TECHNICAL FIELD

The present invention relates to a fuel injection device that is used in an internal combustion engine and that mainly injects fuel.

BACKGROUND ART

One of background art in this technical field is JP 2011-153548 A (PTL 1). This publication discloses a fuel injection nozzle capable of suppressing a decrease of kinetic energy in fuel flow in a suction chamber and promoting atomization while realizing high penetration power.

CITATION LIST

Patent Literature

PTL 1: JP 2011-153548 A

SUMMARY OF INVENTION

Technical Problem

In a fuel injection device, it is necessary to reduce soot components discharged from an engine while considering not only atomization of spray but also inflow after the end of injection. The generation of the soot components is affected by dribbling of fuel at the end of fuel injection. Thus, it is important to form a shape of a nozzle in consideration of the inflow of fuel at the time of valve closing.

PTL 1 does not disclose a problem relating to a period during an operation of a valve body, and it is difficult to achieve reduction of the dribbling of fuel at the time of valve closing although it is possible to improve the atomization performance.

Therefore, an object of the present invention is to provide a structure capable of reducing dribbling of fuel generated at the time of closing a valve body.

Solution to Problem

In order to achieve the above object, a fuel injection device includes: a valve body; and a seat member having a seat portion on which the valve body is seated and having a fuel injection hole formed on a downstream side of the seat portion. The seat member is formed such that a gap between the seat member and the opposing valve body in the whole region on the downstream side of the fuel injection hole is smaller than a diameter of the fuel injection hole.

Advantageous Effects of Invention

According to the configuration of the present invention, the fuel is easily discharged from the injection hole by the valve operation generated at the time of valve closing so that it is possible to reduce the dribbling.

BRIEF DESCRIPTION OF DRAWINGS

FIG. 1 is a cross-sectional view illustrating a structure of a fuel injection device according to a first embodiment of the present invention, and is a longitudinal cross-sectional view illustrating a cut surface parallel to a center axis 100a.

DESCRIPTION OF EMBODIMENTS

Hereinafter, embodiments according to the present invention will be described.

First Embodiment

Figure 1:
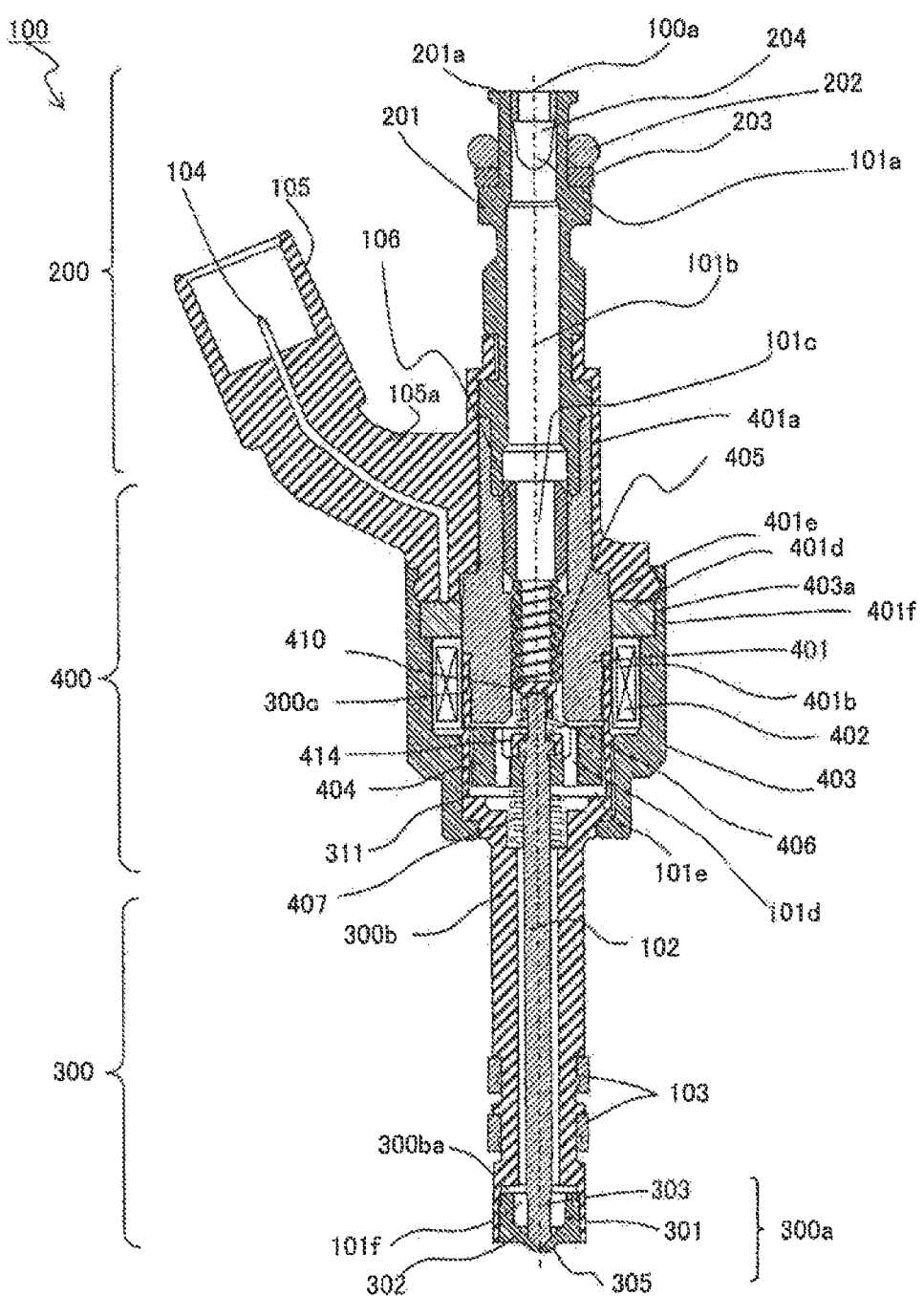
Figure 2:
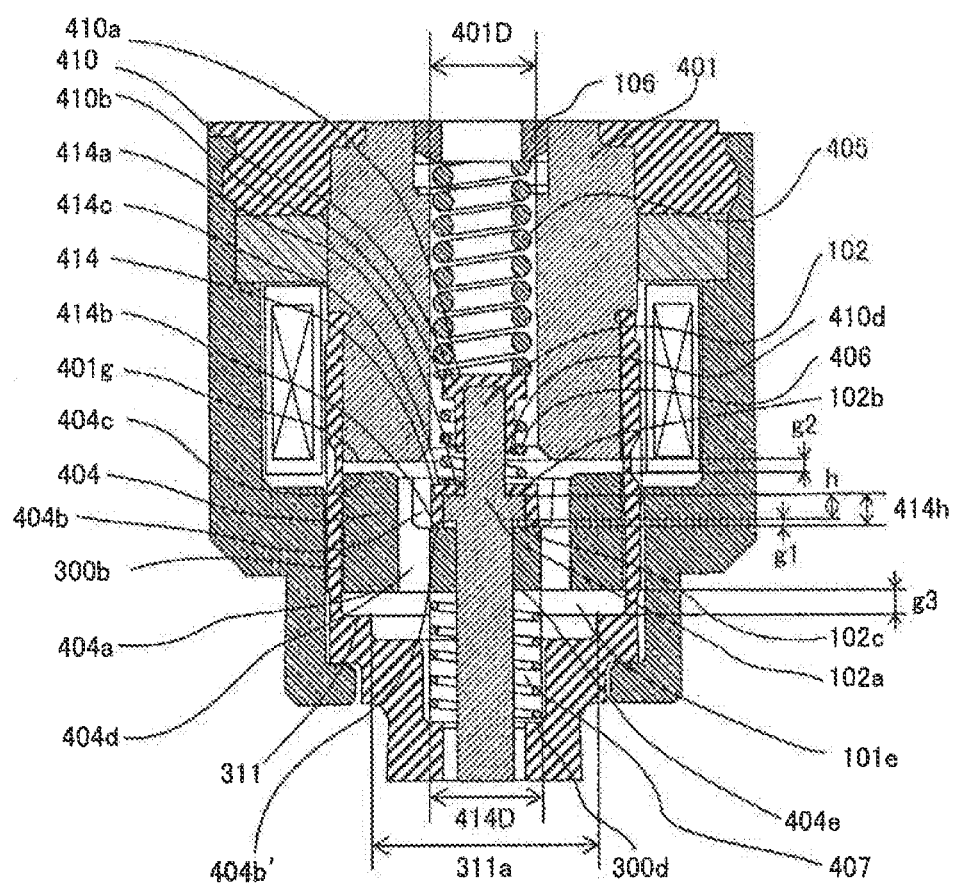
FIG. 2 is an enlarged cross-sectional view illustrating an electromagnetic drive unit of the fuel injection device illustrated in FIG. 1.
Figure 3:
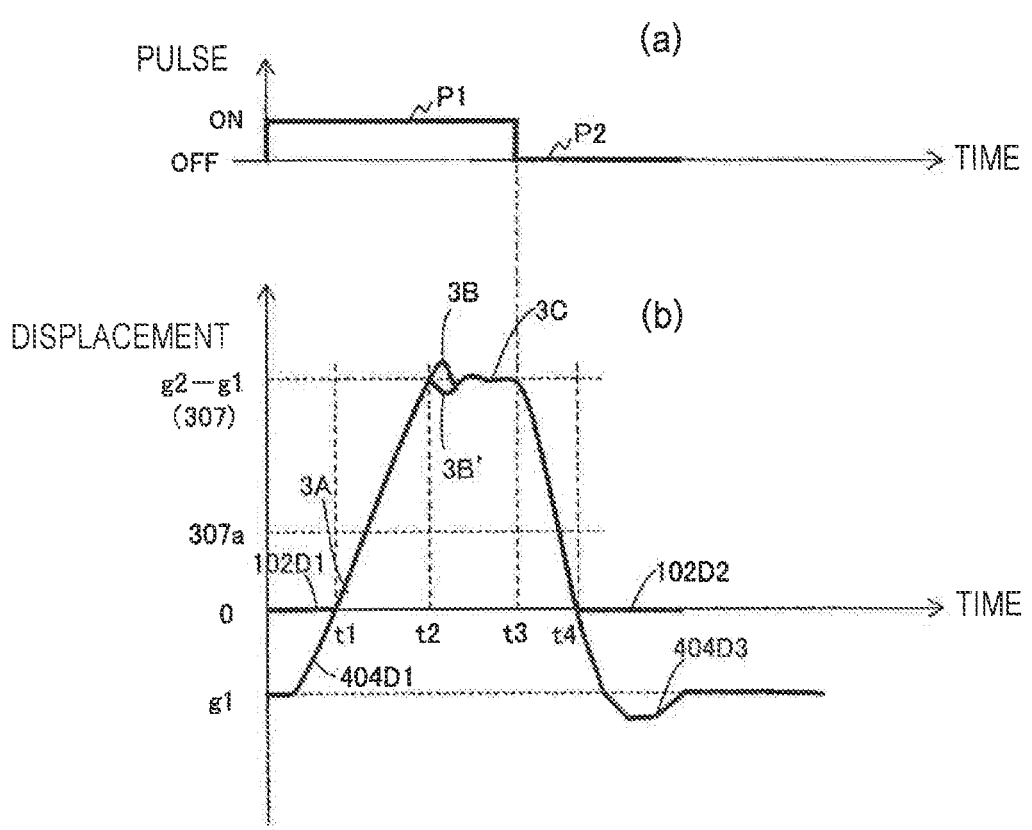
FIG. 3 is a diagram for describing an operation of a valve body of the fuel injection device illustrated in FIG. 1.

Hereinafter, a configuration of a fuel injection device 100 according to a first embodiment of the present invention will be described with reference to FIGS. 1 and 7. FIG. 1 is a cross-sectional view illustrating a structure of the fuel injection device according to the first embodiment of the present invention, and is a longitudinal cross-sectional view illustrating a cut surface parallel to a center axis 100a. FIG. 2 is an enlarged cross-sectional view of an electromagnetic drive unit 400 illustrated in FIG. 1. FIG. 3 is a diagram for describing an operation of a movable portion. FIG. 3(a) illustrates ON and OFF states of an injection command pulse and FIG. 3(b) illustrates each displacement of a plunger rod 102 and a movable iron core 404 with a valve closed state of the plunger rod 102 as displacement 0.

The fuel injection device 100 is constituted by a fuel supply unit 200 that supplies fuel, a nozzle unit 300 provided with a valve unit 300a, which allows or interrupts a flow of the fuel at a distal end portion, and an electromagnetic drive unit 400 that drives the valve unit 300a. In the present embodiment, the description is given by exemplifying an electromagnetic fuel injection device for an internal combustion engine using gasoline as fuel. Incidentally, the fuel supply unit 200, the valve unit 300a, the nozzle unit 300, and the electromagnetic drive unit 400 indicate corresponding parts in the cross section illustrated in FIG. 1, respectively, and do not indicate a single part.

In the fuel injection device 100 of the present embodiment, the fuel supply unit 200 is formed at an upper end side of the drawing, the nozzle unit 300 is formed at a lower end side, and the electromagnetic drive unit 400 is formed between the fuel supply unit 200 and the nozzle unit 300. That is, the fuel supply unit 200, the electromagnetic drive unit 400, and the nozzle unit 300 are arranged in this order along a direction of a center axis 100a.

In the fuel supply unit 200, an end portion on the opposite side of the nozzle unit 300 is connected to a fuel pipe (not illustrated). In the nozzle unit 300, an end portion on the opposite side of the fuel supply unit 200 is inserted into a mounting hole (insertion hole) formed in an intake pipe (not illustrated) or a combustion chamber forming member (a cylinder block, a cylinder head, or the like) of the internal combustion engine. The electromagnetic fuel injection device 100 receives fuel supply from the fuel pipe through the fuel supply unit 200, and injects the fuel from the distal end portion of the nozzle unit 300 into the intake pipe or the combustion chamber. Fuel passages 101 (101a to 101f) are formed inside the fuel injection device 100 such that the fuel flows substantially along the direction of the center axis 100a of the electromagnetic fuel injection device 100 from the end portion of the fuel supply unit 200 to the distal end portion of the nozzle unit 300.

In the following description, regarding both end portions in the direction along the center axis 100a of the fuel injection device 100, the end portion or the end portion side of the fuel supply unit 200 positioned on the opposite side of the nozzle unit 300 will be referred to as a proximal end portion or a proximal end side, and the end portion or the end portion side of the nozzle unit 300 positioned on the opposite side of the fuel supply unit 200 will be referred to as a distal end portion or a distal end side. Further, the description will be given by attaching "upper" or "lower" to each unit forming the electromagnetic fuel injection device using the vertical direction of FIG. 1 as a reference.

The intention thereof is to facilitate understanding of the description, and there is no intention to limit a mounting form of the electromagnetic fuel injection device with respect to the internal combustion engine to the vertical direction.

Hereinafter, configurations of the fuel supply unit 200, the electromagnetic drive unit 400, and the nozzle unit 300 will be described in detail.

The fuel supply unit 200 is constituted by a fuel pipe 201. A fuel supply port 201a is provided at one end portion (upper end portion) of the fuel pipe 201, and the fuel passage 101a is formed at the inner side of the fuel pipe 201 so as to penetrate in the direction along the center axis 100a. The other end portion (lower end portion) of the fuel pipe 201 is joined to one end portion (upper end portion) of a fixed iron core 401.

An O-ring 202 and a backup ring 203 are provided on an outer circumferential side of the upper end portion of the fuel pipe 201.

The O-ring 202 functions as a seal to prevent fuel leakage when the fuel supply port 201a is attached to the fuel pipe. Further, the backup ring 203 is configured to back up the O-ring 202. The backup ring 203 may be formed by laminating a plurality of ring-shaped members. A filter 204 that filters a foreign matter mixed in the fuel is disposed at the inner side of the fuel supply port 201a.

The nozzle unit 300 includes a nozzle body 300b, and the valve unit 300a is formed at a distal end portion (lower end portion) of the nozzle body 300b. The nozzle body 300b is a hollow cylindrical body and forms the fuel passage 101f on the upstream side of the valve unit 300a. A movable iron core receiving portion 311 is formed in a lower fuel passage portion 101e of the electromagnetic drive unit 400. Incidentally, a tip seal 103 to maintain airtightness when being mounted to the internal combustion engine is provided on an outer circumferential surface of the distal end portion of the nozzle body 300b.

The valve unit 300a includes an injection hole forming member 301, a guide portion 302, and a valve body 303 provided at one end portion (lower-end-side distal end portion) of the plunger rod 102. The injection hole forming member 301 is constituted by a fuel passage portion 306 formed with a gap against the valve body 303, a seat portion 304 in contact with the valve body 303 to seal the fuel, and a fuel injection hole 305 injecting fuel and having an injection hole diameter of φD.

At a distal end portion 310 of the injection hole forming member 301, a distal end portion surface 310a which is a surface having a different angle from the seat surface 304a with respect to the center axis 100a and a machining forming surface 310b which becomes a slightly recessed portion toward the center are formed. Incidentally, the machining forming surface 310b is configured to improve the ease of machining, and there is no difference in fuel flow in the present invention depending on the presence or absence of the machining forming surface 310b.

The electromagnetic drive unit 400 is constituted by the fixed iron core 401, a coil 402, a housing 403, the movable iron core 404, an intermediate member 414, a plunger cap 410, a first spring member 405, a third spring member 406, and a second spring member 407. The fixed iron core 401 is also called a fixed core. The movable iron core 404 is called a movable core, a mover, or an armature.

The fixed iron core 401 has a fuel passage 101c in the center portion thereof and a joint portion 401a with respect to the fuel pipe 201. An outer circumferential surface 401b of the fixed iron core 401 is fitted and joined to a large-diameter inner circumferential portion 300c of the nozzle body 300b and is fitted and joined to an outer-circumferential-side fixed iron core 401d at an outer circumferential surface 401e which is larger in diameter than the outer circumferential surface 401b. The coil 402 is wound around the fixed iron core 401 and an outer circumferential side of the large-diameter portion 300c of a cylindrical member.

The housing 403 is provided so as to surround the outer circumferential side of the coil 402 and forms an outer circumference of the electromagnetic fuel injection device 100. An upper-end-side inner circumferential surface 403a of the housing 403 is connected to an outer circumferential surface 401f of the outer-circumferential-side fixed iron core 401d that is joined to the outer circumferential surface 401e of the fixed iron core 401.

The movable iron core 404 is arranged on a lower end face 401g side of the fixed iron core 401. An upper end face 404c of the movable iron core 404 opposes the lower end face 401g of the fixed iron core 401 with a gap g2 therebetween in a valve closed state. Further, the outer circumferential surface of the movable iron core 404 opposes an inner circumferential surface of the large-diameter portion 300c of the nozzle body 300b with a slight gap therebetween, and the movable iron core 404 is provided at the inner side of the large-diameter portion 300c of the cylindrical member so as to be movable in the direction along the center axis 100a.

A magnetic path is formed such that a magnetic flux circulates in the fixed iron core 401, the movable iron core 404, the housing 403, and the large-diameter portion 300c of the cylindrical member. As the magnetic flux flows between the lower end face 401g of the fixed iron core 401 and the upper end face 404c of the movable iron core 404, the movable iron core 404 is attracted toward the fixed iron core 401 by a generated magnetic attraction force.

A recessed portion 404b recessed from the upper end face 404c side to the lower end face 404a side is formed in a center portion of the movable iron core 404. A fuel passage hole 404d is formed in bottom surfaces of the upper end face 404c and the recessed portion 404b as a fuel passage 101d penetrating up to the lower end face 404a side in the direction along the center axis 100a. Further, a through-hole 404e that penetrates up to the lower end face 404a side is formed on the bottom surface of the recessed portion 404b in the direction along the center axis 100a. The plunger rod 102 is provided so as to be inserted through the through-hole 404e. The plunger rod 102 is fixed by fitting with the plunger cap 410 and has a large-diameter portion 102a. The intermediate member 414 is a cylindrical member having a recessed portion serving as a step on inner and outer circumferences, and has an inner circumferential surface 414a abutting on an upper surface 102b of the large-diameter portion 102a of the plunger rod and an outer circumferential surface 414b abutting on a bottom surface 404b' of the recessed portion of the movable iron core. A gap g1 is provided between a lower surface 102c of the large-diameter portion and the bottom surface 404b' of the movable iron core recessed portion 404b. The gap g1 is a length obtained by subtracting a height h formed by the upper surface 102b and the lower surface 102c of the large-diameter portion of the plunger rod from a height 414h of the step of the recessed portion of the intermediate member 414. Below the movable iron core 404, the movable iron core receiving portion 311, which is a part of the nozzle body 300b, is formed from the outer circumferential side of the nozzle body 300b to an inner circumferential cavity to have a diameter portion of 311a at the inner circumferential side.

An upper end portion of the first spring member 405 abuts on a lower end face of a spring force adjustment member 106, and a lower end portion of the first spring member 405 abuts on an upper spring bearing 410a of the plunger cap 410 to bias the plunger rod 102 downward via the plunger cap 410. An upper end portion of the third spring member 406 abuts on a lower spring bearing portion 410b of the plunger cap 410, and a lower end portion of the third spring member 406 abuts on an upper surface 414c of the intermediate member 414 to bias the intermediate member 414 downward. An upper end portion of the second spring member 407 abuts on the lower surface 404a of the movable iron core 404, and a lower end portion of the second spring member 407 abuts on a stepped portion 300d of the nozzle body 300b to bias the movable iron core 404 upward.

The coil 402 is assembled to the outer circumferential side of the fixed iron core 401 and the large-diameter portion 300b of the cylindrical member in the state of being wound around a bobbin, and a resin material is molded around the coil. With the resin material used for such molding, a connector 105 having a terminal 104 lead out from the coil 402 is integrally molded.

Next, an operation of the fuel injection device 100 in the present embodiment will be described. The description will be mainly given with reference to FIG. 2 which is an enlarged view of the electromagnetic drive unit 400, FIG. 3 which describes an operation of the movable portion, and FIG. 4 which is an enlarged view of the valve unit 303a.

In the valve closed state where the coil 402 is not energized, the plunger rod 102 abuts on the seat portion 304 to close the valve by a force obtained by subtracting a biasing force of the third spring member 406 from biasing forces of the first spring member 405 and the second spring member 407 which bias the plunger rod 102 in a valve closing direction. This state is called a valve-closed stationary state. At this time, the movable iron core 404 abuts on the outer-circumferential-side stepped portion 414b of the intermediate member 414 and is arranged at a valve closing position. Incidentally, the gaps of the movable parts concerning a valve opening operation is configured as follows in the valve closed state of the fuel injection device of the present embodiment. The gap g2 is provided between the upper end face 404c of the movable iron core 404 and the lower end face 401g of the fixed iron core 401. The gap g1 is provided between the bottom surface 404b' of the recessed portion 404b of the movable iron core 404 and the lower surface 102c of the large-diameter portion of the plunger rod. A relationship between g1 and g2 is configured such that g2>g1.

After energizing the coil 402 (P1), a magnetomotive force is generated by an electromagnet constituted by the fixed iron core 401, the coil 402, and the housing 403. Due to this magnetomotive force, a magnetic flux flows to circulate in a magnetic path formed by the fixed iron core 401 configured to surround the coil 402, the housing 403, the large-diameter portion 300d of the nozzle body, and the movable iron core 404. At this time, a magnetic attractive force acts between the upper end face 404c of the movable iron core 404 and the lower end face 401g of the fixed iron core 401, and the movable iron core 404 and the intermediate member 414 are displaced toward the fixed iron core 401. Thereafter, the movable iron core 404 is displaced by g1 (404D1) until abutting on the lower surface 102c of the large-diameter portion of the plunger rod. At this time, the plunger rod 102 does not move (102D1).

Thereafter, when the movable iron core 404 abuts on the lower surface 102c of the large-diameter portion of the plunger rod at a timing t1, the plunger rod 102 receives an impact force from the movable iron core 404 to be pulled up, and the plunger rod 102 moves away from the seat portion 304. As a result, a gap is formed in the seat portion so that the fuel passage opens. Since the valve starts to open by receiving the impact force, the plunger rod 102 rises sharply (3A).

Thereafter, the plunger rod 102 is displaced by (g2−g1) and the upper surface 404c of the movable iron core 404 abuts on the lower surface 401g of the fixed iron core 401 at a timing t2, then, the plunger rod 102 is displaced upward (3B), the movable iron core 404 is displaced downward (3B'), and both the plunger rod 102 and the movable iron core 404 are stabilized at the displacement of (g2−g1) (307) after being brought into contact with each other again (3C).

When the energization to the coil 402 is interrupted (P2) at a timing t3, the magnetic force begins to disappear, and a valve closing operation is performed by the downward biasing force of the spring. After the displacement of the plunger rod 102 passes through a displacement position 307a near the middle of the displacement during valve closing and becomes zero at a timing of t4, the plunger rod abuts on the seat portion 304 and the valve closing is completed (102D2).

After moving to g1 (404D2), which is the initial position, after the valve closing, the movable iron core 404 is further displaced downward and then stops at the position of g1 (404D3).

Figure 4:
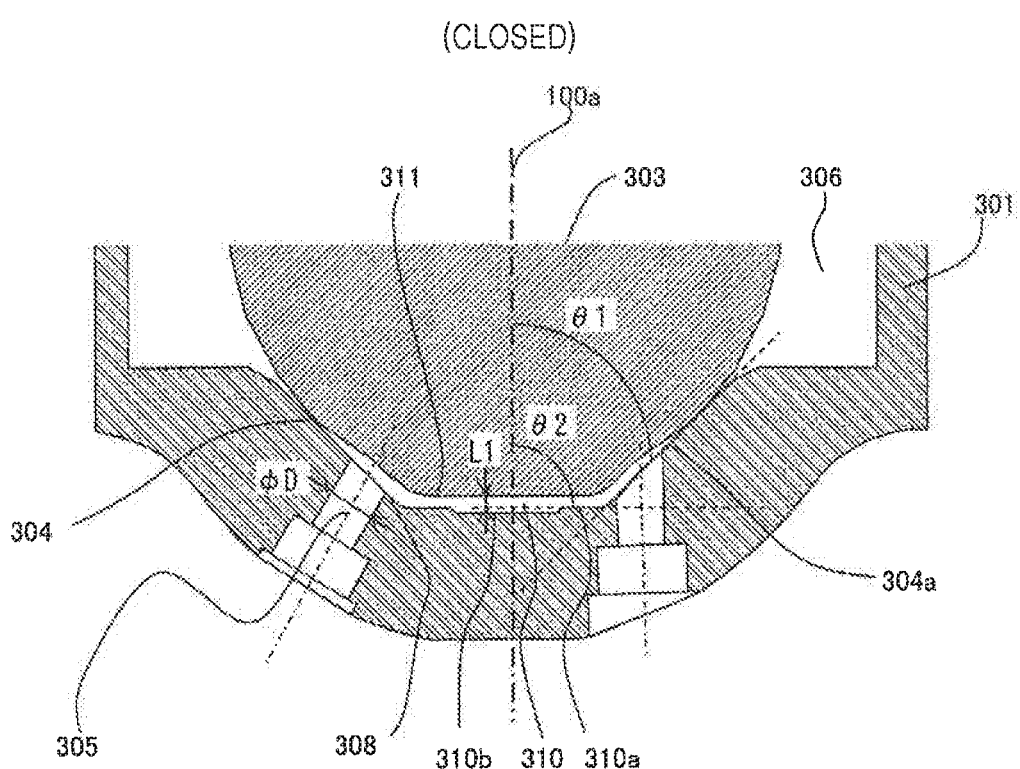
FIG. 4 is an enlarged cross-sectional view illustrating the periphery of a fuel injection hole of the fuel injection device illustrated in FIG. 1.

FIG. 4 illustrates the case where the valve body 303 is closed. The seat surface 304a having the seat portion 304 is formed to have an angle Θ1 with respect to the center axis 100a of the fuel injection device. The injection hole forming member surface 310a of the injection hole forming member 301 is formed to have an angle Θ2 with respect to the center axis 100a of the fuel injection device. A gap L1 is formed between the movable iron core receiving portion 311 of the valve body 303 and the injection hole forming member distal end portion surface 310a in the valve closed state.

Figure 5:
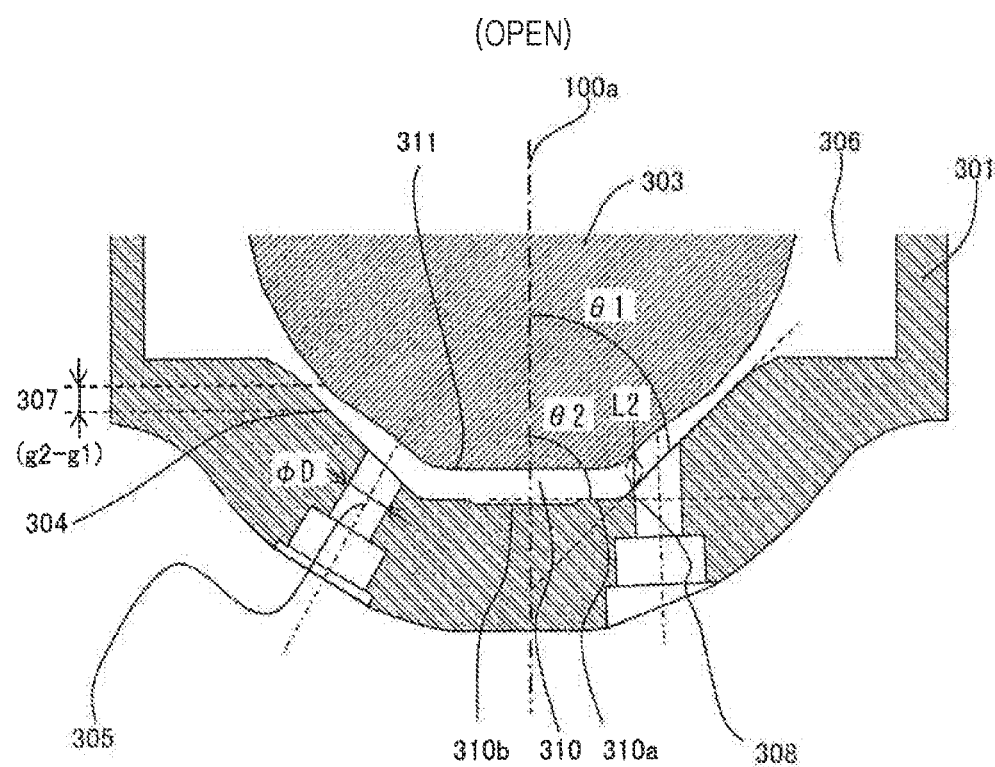
FIG. 5 is an enlarged cross-sectional view illustrating the periphery of the fuel injection hole of the fuel injection device illustrated in FIG. 1.

FIG. 5 illustrates a view when the valve body 303 is open. The displacement 307 (g2−g1 in FIG. 3) is formed between the valve body 303 and the seat portion 304. In the valve open state, an end portion 308 on the downstream side of the fuel injection hole and a point of the valve body 303 corresponding to the end portion 308 in the axial direction are formed to have a gap of L2.

The injection hole forming member 301 is inserted and fixed in a recessed portion inner circumferential surface 300ba formed at the distal end portion of the nozzle body 300b. At this time, an outer circumference of a distal end face of the injection hole forming member 301 and an inner circumference of a distal end face of the nozzle body 300b are welded to seal the fuel.

The guide portion 302 is on the inner circumferential side of the injection hole forming member 301, and has a slight gap formed against a distal end (lower end side) of the plunger rod 102 while forming a guide surface, and performs guide when the plunger rod 102 moves in the direction (valve opening/closing direction) along the center axis 100a.

In the fuel injection device including: the valve body 303; and a seat member (injection hole forming member 301) having the seat portion 304 on which the valve body 303 is seated and having the fuel injection hole 305 formed on the downstream side of the seat portion 304, the seat member (injection hole forming member 301) is formed such that the gap between the seat member and the opposing valve body 303 in the whole region on the downstream side of the fuel injection hole 305 is smaller than the diameter φD of the fuel injection hole 305. Incidentally, a gap, which becomes maximum in the valve closed state, is formed between the distal end portion surface 311 of the valve body 303 and the injection hole forming member distal end portion surface 310a on the downstream side of the fuel injection hole 305 in the present embodiment. This gap is larger than L1. Then, this maximum gap is formed so as to be smaller than the diameter φD of the fuel injection hole 305.

Further, the seat member (injection hole forming member 301) is formed so as to have the maximum gap against the opposing valve body 303 in the whole region on the downstream side of the fuel injection hole 305 being smaller than a gap between an inlet face of the fuel injection hole 305 at the time of valve opening and an opposing portion of the valve body opposing the inlet face (the axial gap L2 from the end portion 308 on the downstream side of the fuel injection hole).

Specifically, it is configured such that the gap L2 in the center axis direction, between the most downstream end portion 308 of the inlet face of the fuel injection hole 305 at the time of valve opening and the opposing portion of the valve body 303 opposing the most downstream end portion 308, is larger than the maximum gap between the distal end portion surface 311 of the valve body 303 and the distal end portion of the seat member (injection hole forming member distal end portion surface 310a).

Figure 6:
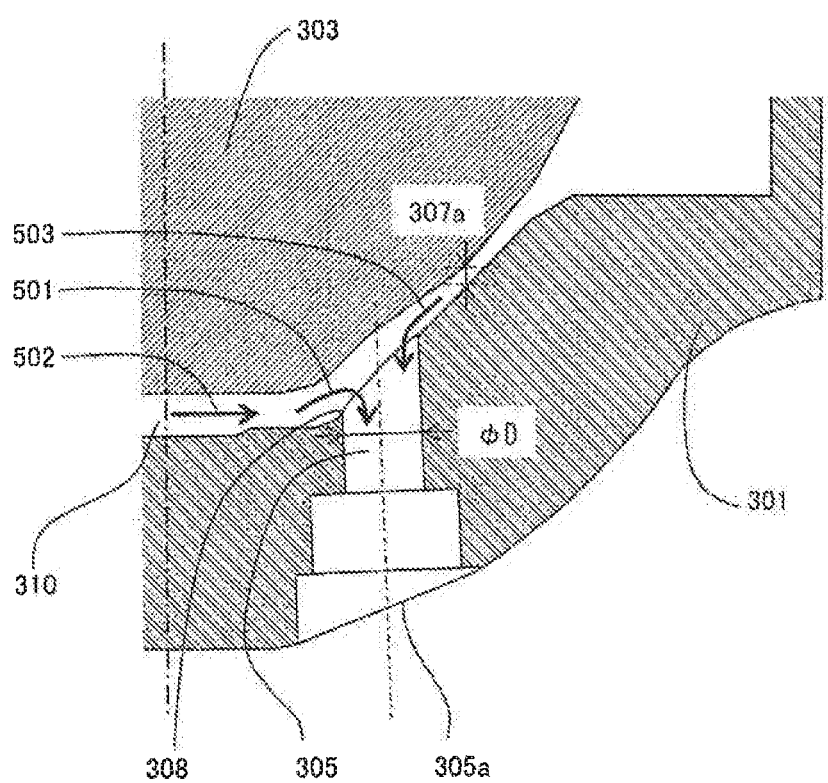
FIG. 6 is a view illustrating a state of flow in the flow path in the periphery of the fuel injection hole of the fuel injection device illustrated in FIG. 1.

In this manner, the gap L1 opposing the injection hole forming member 301 in the region on the fuel injection device axis 100a side of the fuel injection hole 305 is smaller than the diameter φD of the fuel injection hole 305 in the present embodiment. As a result, a fuel flow 502 generated in the center portion of the fuel injection device becomes a high-speed flow during the valve closing due to the narrow gap and the downward displacement of the valve body 303 during the valve closing as illustrated in FIG. 6. Accordingly, the speed of a flow 501 into the fuel injection hole 305 also increases. Thus, there is little inflow of fuel and dribbling is little after closing the valve. Therefore, it is possible to reduce adhesion of fuel which becomes deposits serving as a soot generation factor.

Figure 7:
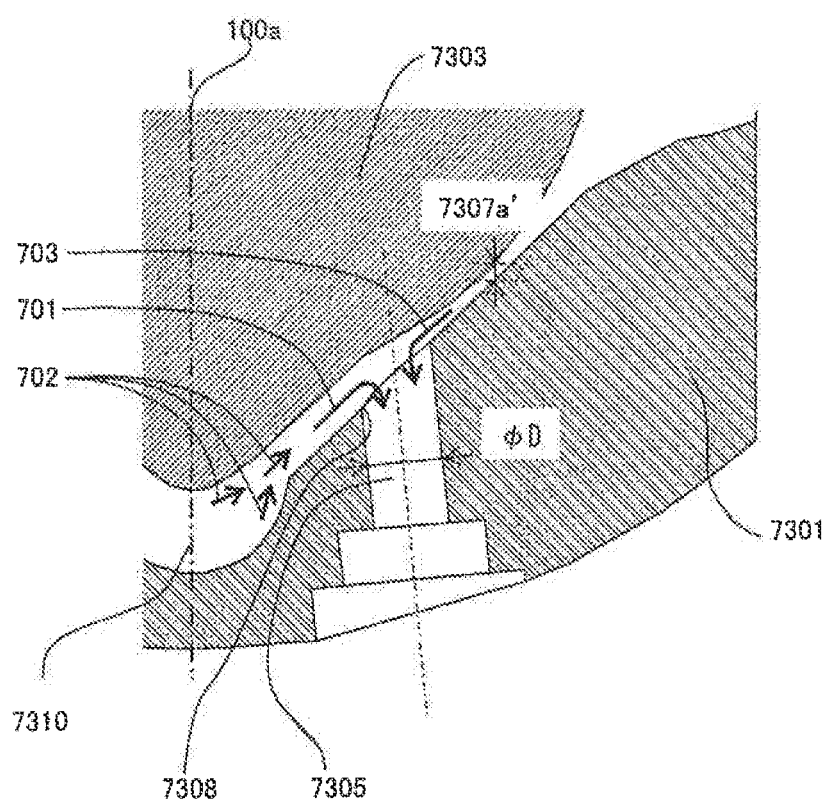
FIG. 7 is a view illustrating a state of flow in a flow path in the periphery of a fuel injection hole of a fuel injection device as a conventional example.

On the other hand, when a gap between a valve body 7303 close to a center 7100a and an injection hole forming member 7301 is larger than an injection hole 7305 differently from the present embodiment as illustrated in FIG. 7, a gap on the downstream side is large during the valve closing. Therefore, generation of a return flow 702 of fuel is delayed, and further, flow speed of a flow 701 generated on a lower end side of the injection hole also becomes slow so that inflow becomes gentle. Thus, the fuel is continuously discharged even after the valve is closed so that dribbling is caused, and there is a risk of fuel adhesion that becomes the deposits serving as the soot generation factor.

Further, since the gap L1, which opposes the injection hole forming member 301 in the region on the fuel injection device axis 100a side of the fuel injection hole 305 is smaller than the gap L2 between the lower end portion 308 of the fuel injection hole 305 and the opposing portion of the valve body 303 opposing the lower end portion 308 at the time of valve opening, the fuel flow 502 generated in the distal end portion 310 becomes the flow 501 flowing into the fuel injection hole 305 remaining at high speed without an increase in flow path area, and thus, the fuel is favorably cut after closing the valve so that there is little dribbling. Thus, the adhesion of fuel which becomes the deposits serving as the soot generation factor is reduced.

Further, it is configured such that the gap L1, which opposes the injection hole forming member 301 in the region on the fuel injection device axis 100a side of the fuel injection hole 305 is substantially constant in a region close to the center axis 100a of the fuel injection device of the injection hole 305. That is, the seat member (injection hole forming member 301) is configured such that the gap against the opposing valve body 303 in the whole region on the downstream side of the fuel injection hole 305 is substantially constant in the valve closed state as illustrated in FIG. 4.

As a result, a pressure loss of the fuel flow 502, generated in the distal end portion 310, due to enlargement and reduction of the flow path on the way is reduced, and the fuel flows into the fuel injection hole 305 remaining at high speed. Therefore, since the flow 501 flowing into the fuel injection hole 305 is formed, the fuel is easily cut after closing the valve so that there is little dribbling. Thus, the adhesion of fuel which becomes the deposits serving as the soot generation factor is reduced.

Further, the distal end portion (distal end portion surface 311) of the seat member is formed in a substantially linear shape in a direction orthogonal to the axial direction of the valve body 303 on the downstream side of the fuel injection hole 305 as illustrated in FIGS. 4 and 5 in the present embodiment. Further, the distal end portion (distal end portion surface 311) of the valve body opposing the distal end portion (distal end portion surface 310a) of the seat member is also formed in a substantially linear shape in the direction orthogonal to the axial direction of the center axis 100a of the valve body 303. Further, the valve body 303 is formed in a substantially spherical shape on the upstream side of the distal end portion (the distal end portion surface 311) of the valve body.

The seat member (injection hole forming member 301) is configured such that the angle Θ1 formed between the seat surface 304a and the center axis 100a is smaller than the angle Θ2 formed between the distal end portion surface 310a of the injection hole forming member and the center axis 100a of the fuel injection device. As a result, it is possible to reduce the gap L1 formed between both the valve body and the seat member and to facilitate adjustment through machining of the valve body 303 and the injection hole forming member 301, and thus, it is possible to supply the fuel injection device at low cost. Incidentally, the main object of the present invention is to provide the configuration in which the gap between both the valve body and the seat member is narrow, and thus, it is conceivable to determine an angle in consideration of ease of machining.

Further, the present embodiment has been described that the diameter of the fuel injection hole is the same, but the invention is not limited thereto.

In the configuration of the present embodiment, the movable iron core receiving portion 311 is integrated with the nozzle body 300b, and thus, it is possible to determine a valve-closed-state gap g3 between the movable iron core 404 and the movable iron core receiving portion 311 in the valve closed state by processing the nozzle body 300b, and it is possible to improve the performance with a simple method without adding parts.

Further, an outer diameter 414D of the intermediate member is smaller than an inner diameter 401D of the fixed iron core in the configuration of the present embodiment. Therefore, when assembling the fuel injection device, the plunger cap 410, the plunger rod 102, the third spring member 406, and the intermediate member 414 can be integrated with each other in advance, and then, are assembled into the fuel injection device in a state where the spring force adjustment member 106 and the first spring member 405 are not inserted after determining the gap g1 by a step height 414h of the intermediate member and a height h of the large-diameter portion of the plunger rod, and thus, it is possible to perform stable management of the gap g1 while facilitating the assembly. Although outer diameter 414D of the intermediate member 414 is made smaller than the inner diameter 401D of the fixed iron core 401 in the present embodiment, it suffices if the outermost diameter of a member to be assembled in advance is small. When the outermost diameter of the plunger cap 410 is larger than the outermost diameter 414D of the intermediate member, the outermost diameter of the plunger cap 410 may be made smaller than the inner diameter 401D of the fixed iron core 401.

Incidentally, even when the movable iron core does not have the recessed portion 404b but is flush with 404c in the present embodiment, it is possible to obtain the same operational effect as the present embodiment. As the recessed portion 404b of the movable iron core is provided, the intermediate member 414 can be arranged on the much lower side, it is possible to shorten a vertical length of the plunger rod 102, and it is possible to configure the plunger rod 102 with high accuracy.

Incidentally, the seat surface 304 and an injection hole opening surface 304a are flush with each other in the present invention, but the invention is not limited thereto. For example, the injection hole opening surface 304a may have a surface recessed downward from the seat surface 304. In this manner, it is also possible to change the length of the fuel injection hole 305 and to improve the degree of freedom in designing the injection hole forming member 301.

Second Embodiment

Figure 8:
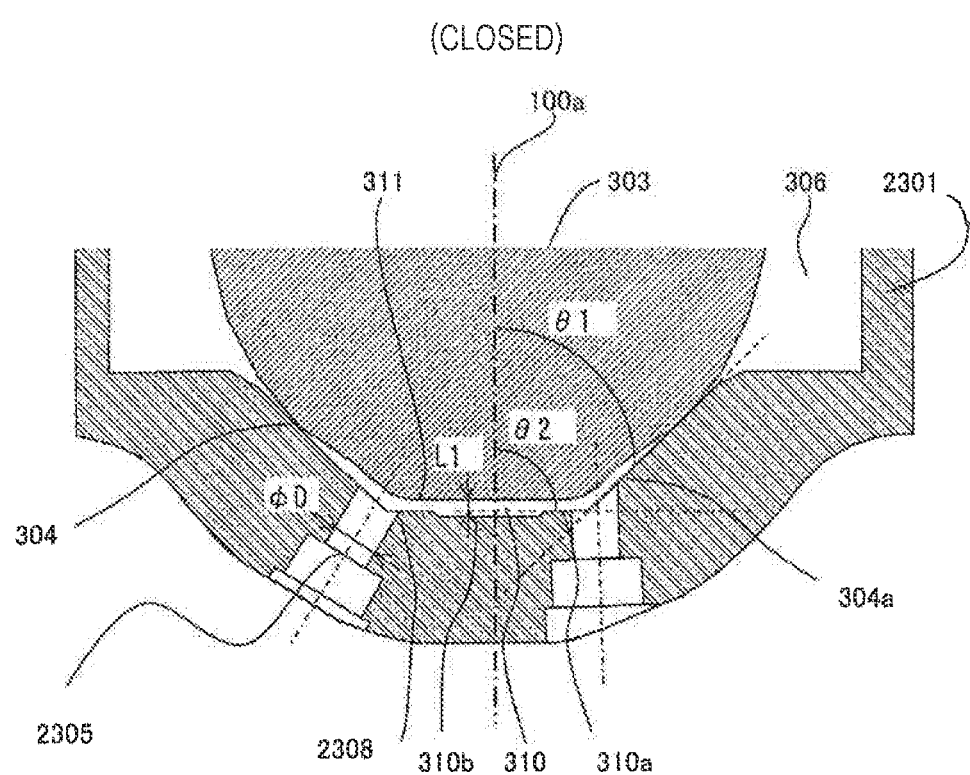
FIG. 8 is an enlarged cross-sectional view illustrating the periphery of a fuel injection hole of a fuel injection device according to a second embodiment of the present invention.
Figure 9:
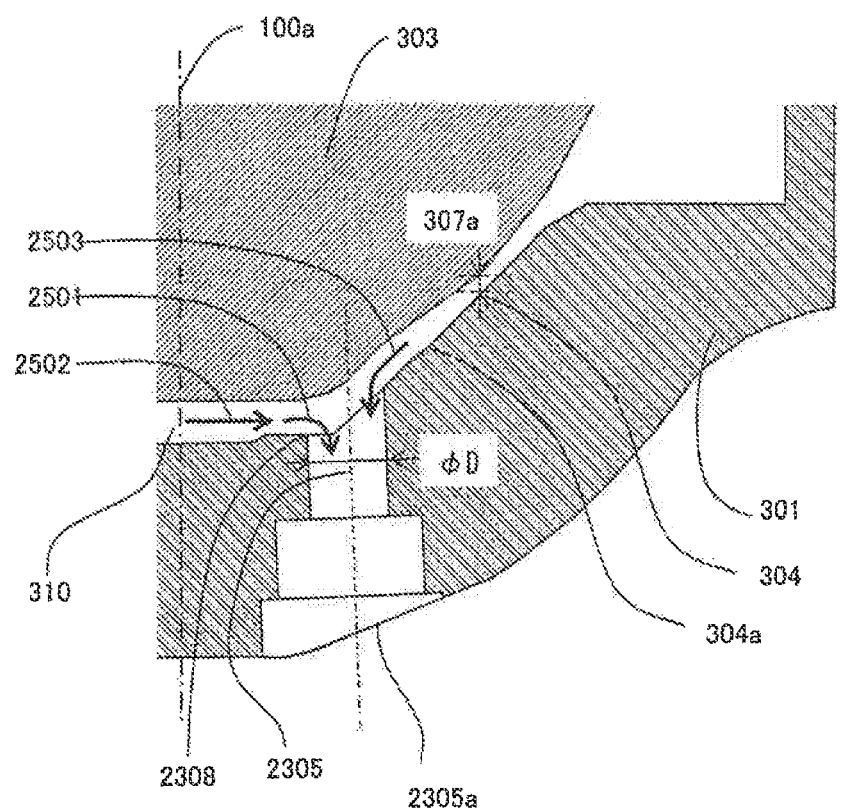
FIG. 9 is a view illustrating a state of a flow in a flow path in the periphery of the fuel injection hole of the fuel injection device illustrated in FIG. 8.

A second embodiment of the present invention will be described with reference to, FIGS. 8 to 9. In the drawings, parts denoted by the same reference signs as those of the first embodiment have no difference in configurations, operations, and effects from those of the first embodiment, and thus, the description thereof will be omitted.

A difference from the first embodiment is that an inlet of a fuel injection hole 2305 is perforated so as to straddle the injection hole opening surface 304a and the distal end portion surface 310a of the injection hole forming member 301. That is, the injection hole opening surface 304a formed to be substantially parallel with the seat surface 304 and the distal end portion surface 310a of the injection hole forming member 301, which is formed to be substantially orthogonal to the axial direction of the center axis 100a, are configured to intersect with each other at an inner circumferential side of an inlet face of the fuel injection hole 2305. With this configuration, a flow 2502 generated in the course of closing the valve body 303 forms a high-speed flow 2502 due to a narrow gap between the valve body 303 and the distal end portion 310 of the injection hole forming member, and a flow 2501 flowing into the injection hole 2305 directly flows into the injection hole 2305 without no step, thereby reducing a decrease in speed caused by a pressure loss occurring in a fuel flow path as compared with the case of the first embodiment.

Accordingly, there is little inflow of fuel and dribbling is little after closing the valve. Thus, the adhesion of fuel which becomes the deposits serving as the soot generation factor is reduced. Further, a flow 2503 flowing into the injection hole 2305 from the upstream side can be made closer to the center than the seat portion 304, and thus, it is possible to cause the flowing with a stable flow distribution state, so that fluctuations of the flowing are reduced and dribbling is reduced.

Incidentally, the present invention is not limited to the respective embodiments described above, and includes various modifications. For example, the above-described embodiments have been described in detail in order to describe the present invention in an easily understandable manner, and are not necessarily limited to one including the entire configuration thereof. In addition, some configurations of a certain embodiment can be substituted by configurations of another embodiment, and further, a configuration of another embodiment can be also added to a configuration of a certain embodiment. In addition, addition, deletion, or substitution of other configurations can be made with respect to some configurations of each embodiment.

REFERENCE SIGNS LIST 100 fuel injection device
101 fuel passage
102 plunger rod
200 fuel supply unit
300 nozzle unit
302 guide portion
303 valve body
304 seat portion
305 fuel injection hole
306 flow path portion
400 electromagnetic drive unit
401 fixed iron core
402 coil
403 housing
404 movable iron core
405 first spring member
406 third spring member
407 second spring member
414 intermediate member

The invention claimed is:
1. A fuel injection device comprising:
a valve body; and a seat member opposing the valve body and having a seat portion on which the valve body is seated and having a fuel injection hole formed on a downstream side of the seat portion, wherein the seat member is formed such that a gap between the seat member and the opposing valve body in a whole region on a downstream side of the fuel injection hole is smaller than a diameter of the fuel injection hole, and an inlet face of the fuel injection hole and a distal end portion of the seat member are configured to intersect with each other at an inner circumferential side of the inlet face of the fuel injection hole.

2. The fuel injection device according to claim 1, wherein the seat member is configured such that at least a portion of the gap between the seat member and the opposing valve body on the downstream side of the fuel injection hole is substantially constant.

3. The fuel injection device according to claim 1, wherein the distal end portion of the seat member is formed in a substantially linear shape in a direction orthogonal to an axial direction of the valve body on the downstream side of the fuel injection hole, and a distal end portion of the valve body opposing the distal end portion of the seat member is formed in a substantially linear shape in the direction orthogonal to the axial direction of the valve body.

4. The fuel injection device according to claim 3, wherein the valve body is formed in a substantially spherical shape on an upstream side of the distal end portion of the valve body.

5. The fuel injection device according to claim 1, wherein the seat member is configured such that an angle $\theta 1$ formed by a center axis of the valve body and a downstream surface of the seat member is smaller than an angle $\theta 2$ formed by the center axis of the valve body and the distal end portion of the seat member.

6. A fuel injection device comprising:

a valve body; and a seat member opposing the valve body and having a seat portion on which the valve body is seated and having a fuel injection hole formed on a downstream side of the seat portion, wherein the seat member is formed such that a gap between the seat member and the opposing valve body in a whole region on a downstream side of the fuel injection hole is smaller than a gap between an inlet face of the fuel injection hole at a time of valve opening and an opposing portion of the valve body opposing the inlet face, and the inlet face of the fuel injection hole and a distal end portion of the seat member are configured to intersect with each other at an inner circumferential side of the inlet face of the fuel injection hole.

7. The fuel injection device according to claim 6, wherein a gap between a most downstream end portion of the inlet face of the fuel injection hole at the time of valve opening and the opposing portion of the valve body, which opposes the most downstream end portion, is larger than a gap between a distal end of the valve body and the distal end portion of the seat member.

8. The fuel injection device according to claim 6, wherein the seat member is configured such that at least a portion of the gap between the seat member and the opposing valve body on the downstream side of the fuel injection hole is substantially constant.

9. The fuel injection device according to claim 6, wherein the distal end portion of the seat member is formed in a substantially linear shape in a direction orthogonal to an axial direction of the valve body on the downstream side of the fuel injection hole, and a distal end portion of the valve body opposing the distal end portion of the seat member is formed in a substantially linear shape in the direction orthogonal to the axial direction of the valve body.

10. The fuel injection device according to claim 9, wherein the valve body is formed in a substantially spherical shape on an upstream side of the distal end portion of the valve body.

11. The fuel injection device according to claim 6, wherein the seat member is configured such that an angle $\theta 1$ formed by a center axis of the valve body and a downstream surface of the seat member is smaller than an angle $\theta 2$ formed by the center axis of the valve body and the distal end portion of the seat member.

* * * * *